United States Patent [19]

Saxena et al.

[11] Patent Number: 5,751,582
[45] Date of Patent: May 12, 1998

[54] CONTROLLING PROCESS MODULES USING SITE MODELS AND MONITOR WAFER CONTROL

[75] Inventors: Sharad Saxena, Dallas; Purnendu K. Mozumder, Plano; Gregory B. Shinn, Dallas; Kelly J. Taylor, Plano, all of Tex.

[73] Assignee: Texas Instruments Incorporated, Dallas, Tex.

[21] Appl. No.: 719,104

[22] Filed: Sep. 24, 1996

Related U.S. Application Data

[60] Provisional application No. 60/004,224 Sep. 25, 1995.

[51] Int. Cl.⁶ .................................................. G06F 19/00
[52] U.S. Cl. .................... 364/468.16; 364/151; 364/552; 364/490; 364/468.28
[58] Field of Search ............... 364/468.15, 468.16, 364/468.17, 468.28, 552, 554, 149, 150, 151, 152, 578, 488–491

[56] References Cited

U.S. PATENT DOCUMENTS

| | | | |
|---|---|---|---|
| 3,601,588 | 8/1971 | Bristol, II | 364/151 |
| 5,282,131 | 1/1994 | Rudd et al. | 364/164 |
| 5,408,405 | 4/1995 | Mozumder et al. | 364/151 |
| 5,546,312 | 8/1996 | Mozumder et al. | 364/468.03 |
| 5,568,408 | 10/1996 | Maeda | 364/580 |
| 5,661,669 | 8/1997 | Mozumder et al. | 364/151 |

OTHER PUBLICATIONS

"Simultaneous Control of Multiple Measures of Nonuniformity Using Site Models and Monitor Wafer Control", Saxena et al., Semiconductor Process and Device Center, Apr. 11, 1995, pp. 1–14.

Primary Examiner—Joseph Ruggiero
Attorney, Agent, or Firm—Bret J. Petersen; James C. Kesterson; Richard L. Donaldson

[57] ABSTRACT

A method is described for controlling a plurality of nonuniformity parameters in processing discrete products such as semiconductor wafers through a module consisting of several individual processes using site models. The method uses a controlled process to compensate for a subsequent uncontrolled process, which allows process goals of one process to be optimized to enhance the output of a subsequent process of the same module.

21 Claims, 2 Drawing Sheets

NONUNIFORMITY-RING (nur)

NONUNIFORMITY-CENTER (nuc)

NONUNIFORMITY-CANT (cant1)

NONUNIFORMITY-CANT (cant2)

CONTROLLING PROCESS MODULES USING SITE MODELS AND MONITOR WAFER CONTROL

This application claims priority under 35 U.S.C. & 119 (e) (1) of provisional application Ser. No. 60/004,224, filed Sep. 25, 1995.

FIELD OF THE INVENTION

This invention generally relates to the control of semiconductor manufacturing processes, and more particularly to control of a sequence of processes that form a module of semiconductor manufacturing processes.

CROSS-REFERENCE TO RELATED APPLICATIONS

The following coassigned patent applications are hereby incorporated herein by reference:

| Number | Filing Date | Title |
| --- | --- | --- |
| 5,408,405 | 09/20/93 | Multi-Variable Statistical Process Controller for Discrete Manufacturing |
| 5,546,312 | 02/24/94 | Use of Spatial Models for Simultaneous control of Non-Uniformity Metrics |

BACKGROUND

Manufacturing of many types of discrete products can benefit from multi-variable computerized controllers. The semiconductor wafer processing area is an example of an area of particular interest. The small feature sizes and the large number of steps required to fabricate state of the art integrated circuits on semiconductor wafers make it essential that each of the process steps meet a tight set of specifications. Since process variations are inevitable, statistical process control (SPC) is one of the techniques used for controlling fabrication processes. Often, implementing SPC on a wafer-by-wafer basis requires having equipment with in-situ sensors for measuring the desired quality characteristics, or making changes to existing equipment to incorporate in-situ sensors. Obtaining new equipment with in-situ sensors or modifying existing equipment can be expensive. In addition to the cost of the sensors, adding sensors to existing equipment can cause expensive downtime and decrease mean time between failure (MTBF).

A multi-variable statistical process controller, referred to as Monitor Wafer Controller (MWC), for discrete manufacturing was created to assist in fabricating products. The controller is described in detail in U.S. Pat. No. 5,408,405 referenced above. An embodiment of the controller was described therein with reference to semiconductor wafer processing. One of the goals of the monitor based control strategy is to determine if the equipment and process state has changed from its previous estimate based on the monitor wafers (test wafers) and product wafers, and if so, determine a set of corrections to the equipment settings to generate a new process recipe and bring the product quality characteristics on target. A prerequisite for the controller are models of the process and equipment that relate the effects of the equipment controls to the output parameters of interest. The controller performs three tasks: sensing process state changes based on product measurements (Statistical Quality Control), adapting the models to the new state (model tuning), and determining the new settings to correct for the state change (sequential optimization).

Controlling the uniformity of a process is important for profitable manufacturing of semiconductors. Control of across-wafer (spatial) uniformity is becoming especially important given the current trend in semiconductor manufacturing towards single wafer processing and larger wafer sizes. One of the main difficulties in nonuniformity control has been obtaining good process models that relate the equipment controllables to nonuniformity measures. The second patent application referenced above describes an approach for controlling nonuniformity using site models and the MWC discussed above. In this approach, models are created which relate equipment controllables to measurable process output characteristics that can be well modeled rather than relating them to nonuniformity measures directly. Thus, instead of directly modeling a scalar nonuniformity measures like standard deviation, mean, range etc. parameters of interest are modeled individually at many sites across the wafer. The site models are then updated as new data becomes available to reflect the changes in equipment and process state. Also, multiple nonuniformity measures are defined in terms of the individual sites. These measures are used as process goals by an optimizer to generate process recipes for the MWC to control the process.

This approach of using site models to define nonuniformity measures, which then serve as process goals, results in a separation of process observables and goals in the design of the controller algorithms. Models relate the controllables (equipment controls) and measurable quantities (parameters that can be read from a sensor). Goals are then expressed as functions of the model outputs (a degenerate case would be one where the goals are identically the outputs of the models). This separation of process observables and goals allows better models because site models generated in terms of equipment setting are more accurate than models generated for nonuniformity measures.

SUMMARY OF THE INVENTION

The present invention extends the use of site models and Monitor Wafer Control to multiprocess applications, or applications related to a sequence of related processes which form a process module. In contrast, the previous disclosures, discussed above, focussed on keeping a single process step in a manufacturing flow within specifications. The method of the present invention has been applied to control a sequence of processes that form a process module in two areas of semiconductor manufacturing. These two implementations are discussed herein as embodiments of the present invention and are merely given as examples of the present invention.

It was discovered that the use of site models and the methods of the previous patent applications cited above could be used to an increased advantage by correlating the goals of these interrelated processes. Thus, the method of the prior patent application was modified to take into account the interactions between the processes and thereby control the nonuniformities over several processes. The ability to define the desired nonuniformity measures allows the process engineer to specify the spatial patterns of interest from one process to be used to optimize a subsequent process. In addition, the method of the present invention allows the process engineer to dynamically change or add to the nonuniformity measures of interest.

Each of the embodiments of the present invention involves processes used to form interlevel dielectrics in CMOS products. These processes use PETEOS (plasma enhanced tetraethoxysilane oxide) as the interlevel dielectric. The first embodiment uses the method of the present invention to control nonuniformities during chemical-mechanical polishing (CMP) to planarize the PETEOS oxide on the surface of the wafer during CMOS production. Often CMP equipment has a-known nonuniformity pattern. For example, the equipment used in the preferred embodiment causes the center to be thicker than the edge of the wafer at the completion of the CMP process. The MWC described above with the method of the present invention was used to design a PETEOS process to be center thin, to compensate for the center thick CMP process, thereby providing better uniformity at the end of planarization.

A second embodiment relates to forming a via or contact during multilevel metalization. The PETEOS oxide deposited on a semiconductor wafer is patterned and etched to fabricate vias or contact holes to form electrical connections from one level of metalization to another. Since the etch rate of the oxide is highly dependent on the oxide film stoichiometry, it is possible to affect the output of a subsequent etch process by changing the film stoichiometry in a previous step. Thus, it is necessary to not only control the film thickness and stress during deposition, but to also control the film stoichiometry to ensure a fixed etch-rate in these subsequent processes. Using an embodiment of the present invention, the etch rate of a deposited film may be controlled by making it an additional target of the deposition process.

BRIEF DESCRIPTION OF THE DRAWINGS

The foregoing and further aspects of the invention are illustrated in the accompanying drawings wherein like elements are denoted by like reference designators and in which.

DETAILED DESCRIPTION OF THE PREFERRED EMBODIMENTS

Figure 1:
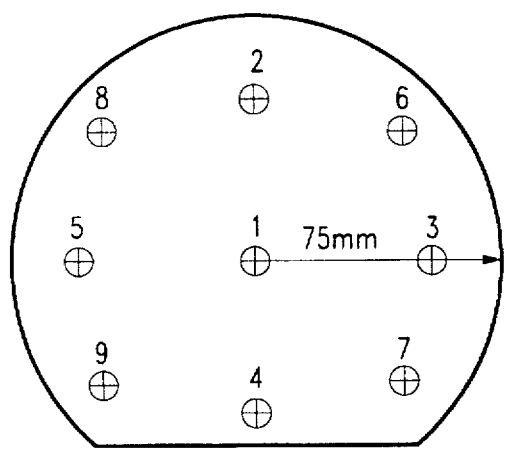
FIG. 1 is a diagram of oxide film measurement sites on a semiconductor wafer.

Whereas the present invention extends the control of nonuniformities in process control using site models and Monitor Wafer Control to multiprocess applications, the following description first details application of the method described in the previous patent application referenced above which were directed to a single process of a module. The preferred embodiments of the present invention are then described. It is to be understood that the scope of the invention also comprehends embodiments different from those described, yet within the scope of the claims. Specifically, the invention could be used with any discrete product manufacturing where control of one or multiple nonuniformity measure is desired.

Site Models and the Monitor Wafer Controller

The Monitor Wafer Controller of U.S. Pat. No. 5,408,405 provides a system for controlling a plurality of process control variables for processing discrete products. A goal of the monitor wafer based control strategy is to determine if the equipment and/or process state has changed from its previous estimate based on the monitor wafers, and if so, determine a set of corrections to the equipment settings to generate a new process recipe and bring the product quality characteristics on target.

The method of the previous patent application Ser. No. 08/124,083, now U.S. Pat No. 5,408,405 a method for controlling nonuniformities using site models to control a single process was developed for the Monitor Wafer Controller to control a PETEOS process. The process for this method is discussed using site models for the PETEOS process, the associated measures of nonuniformity used as goals, and a tuning procedure for both the site and the stress models.

For model based control, models are required that can be adapted to incorporate the process and equipment state changes, and be used to determine optimal process settings to bring the quality characteristics of the process to within their desired range or target. In a preferred embodiment, using the techniques of the above referenced applications, response surface models (RSMs) were created using design of experiments (DOEs). The following paragraphs summarize the procedure used to create surface response models for the PETEOS process.

The Monitor Wafer Controller was demonstrated on a process for TEOS based plasma-enhanced CVD (chemical vapor deposition) (PETEOS) Table 2 lists the control ranges for the parameters of interest on the AMT 5000. The AMT 5000 reactor made by Applied Materials was used for running the process. The primary equipment controls for this process on the AMT 5000 are gas pressure, RF power, wafer temperature, shower head to wafer spacing, TEOS flow, and oxygen flow, and susceptor temperature. The primary response variables to be controlled or goals for the silicon dioxide film were: deposition rate (ic's), a number of thickness nonuniformity measures, 10%HF etch rate (Å/s), stress (MPa), density (g/cc) and mass (g).

A full quadratic model for the nine deposition rates and stress in terms of the five equipment controls was used in the preferred embodiment. The model is of the form:

$$y_k = \beta_o + \sum_{i=1}^{n} \beta_i x_i + \sum_{i=1}^{n} \sum_{j \geq 1}^{n} \beta_{ij} x_i x_j \qquad (1)$$

where dr1, . . . , dr9 is the deposition rate at the nine sites, $y_k$ is the kth output, i.e., dr1, . . . , dr9, stress, $x_i, x_j$ are tho ijth input, i.e., Pressure, . . . , $O_2$, $\beta_0$ is the constant term in the equation, $\beta_i$ is the coefficient of the linear term $x_i$, and $\beta_{ij}$ is the coefficient of the quadratic term $x_i x_j$.

All 21 coefficients were estimated using SAS (Statistical Analysis System) (SAS Institute, Inc., SAS Circle Box 8000, Cary N.C. 27512-8000. SAS Language Guide, release 6.03 edition, 1988).

TABLE 1

| | Coordinates for Oxide Film Measurement Sites on Wafers | | | | | | | | |
|---|---|---|---|---|---|---|---|---|---|
| Site Numbers | Site 1 | Site 2 | Site 3 | Site 4 | Site 5 | Site 6 | Site 7 | Site 8 | Site 9 |
| x-coordinate in mm | 0.0 | 0.0 | 48.2 | 0.0 | −48.2 | 47.7 | 47.7 | −47.7 | −47.7 |
| y-coordinate in mm | 0.0 | 48.2 | 0.0 | −48.2 | 0.0 | 47.7 | −47.7 | 47.7 | −47.7 |

For each wafer, the oxide thickness was measured at 9 sites. The sites were chosen based on analysis of the profile of the oxide film on the wafer. FIG. 1 shows the sites used for measuring the oxide thickness. Table 1 provides the coordinates for each of the sites. It was observed during the modeling that the deposition rate for each of the 9 sites could be modeled very accurately as a function of the equipment controls.

For the PETEOS process, four measures of nonuniformity were used. Two of them have to be controlled to target, the other two are controlled to be within specification limits. Controlled to target means that one wants to achieve a value as close to a desired value as possible. Within specification means any value within a specified range is acceptable. The former measures of nonuniformity, which are controlled to target, are denoted by nur and nuc, and are expressed in terms of the site deposition rates as:

$$nur = \frac{(dr2 + dr3 + dr4 + dr5) - (dr6 + dr7 + dr8 + dr9)}{4} \quad (3)$$

and $$nuc = \frac{(dr1 + dr2 + dr3 + dr4 + dr5 + dr6 + dr7 + dr8 + dr9)}{9} - dr1 \quad (3)$$

The two later measures, which are controlled to specification limits, are measures of asymmetry in deposition, and are denoted as cant1 and cant2. These measures are expressed in terms of deposition rates as:

$$cant1 = \frac{(dr7 + dr9) - (dr6 + dr8)}{(dr1 + dr2 + dr3 + dr4 + dr5 + dr6 + dr7 + dr8 + dr9)} \quad (4)$$

and $$cant2 = \frac{(dr6 + dr7) - (dr8 + dr9)}{(dr1 + dr2 + dr3 + dr4 + dr5 + dr6 + dr7 + dr8 + dr9)} \quad (5)$$

Figure 2:
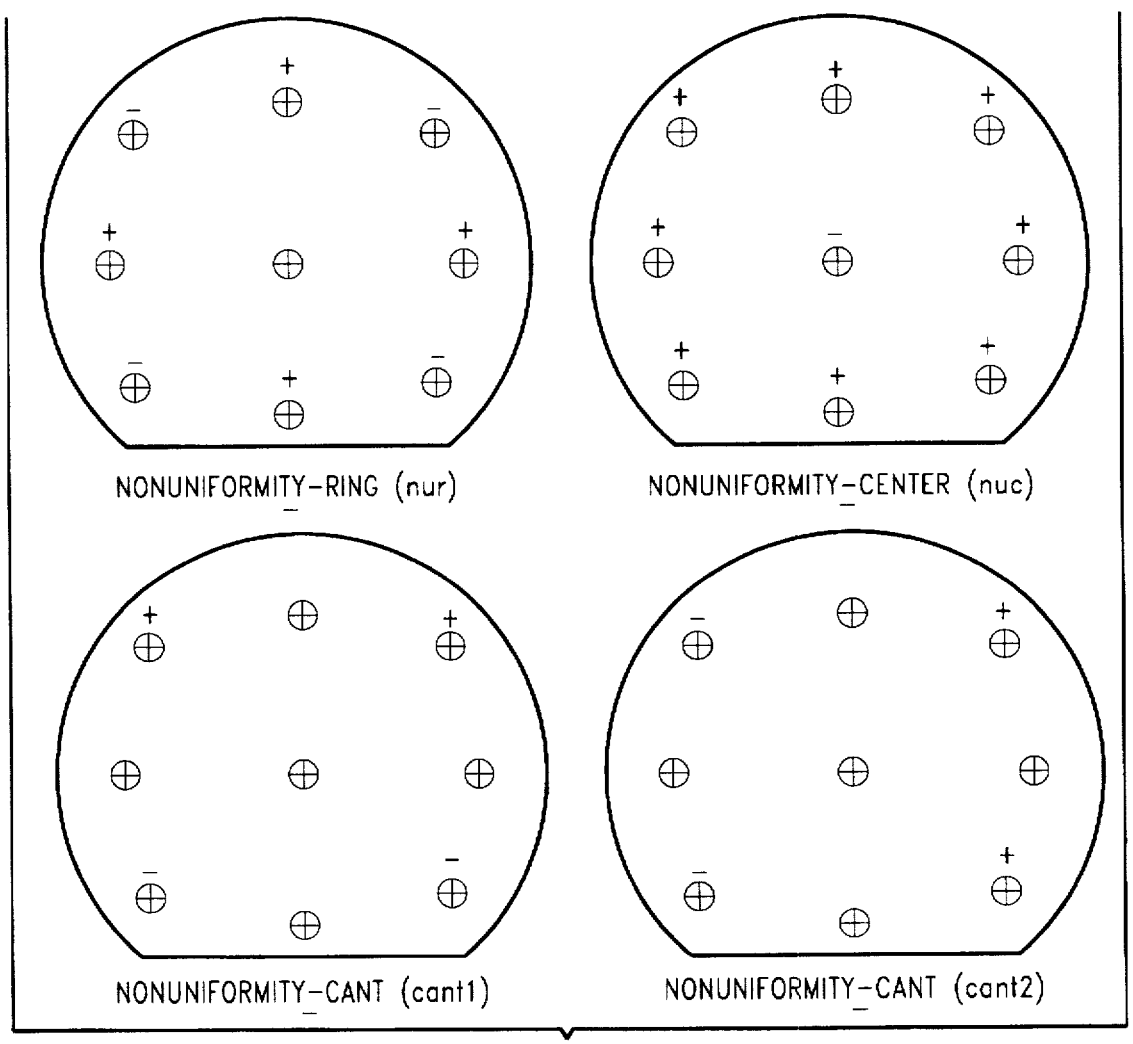
FIG. 2 is a diagram defining the nonuniformity measures for the PETEOS process.

FIG. 2 shows four deposition nonuniformity measures defined in terms of the nine sites.

Similar to the nonuniformities, the mean deposition rate, dr, is expressed as a function of the deposition rates as:

TABLE 2

Equipment Control Ranges for Experiment Design for PETEOS on an AMT 5000.

$$dr = \frac{(dr1 + dr2 + dr3 + dr4 + dr5 + dr6 + dr7 + dr8 + dr9)}{9} \quad (6)$$

| Setting (Units) | Pressure (Torr) | RF (Watts) | Gap (mm) | TEOS (SCCM) | $O_2$ (SCCM) |
|---|---|---|---|---|---|
| Max | 9.5 | 560 | 220 | 1100 | 520 |
| Nominal | 9.0 | 460 | 210 | 1000 | 440 |
| Min | 8.5 | 360 | 200 | 900 | 360 |

To make the models compact for control purposes, it was necessary to "trim" the models. It was decided to make the models compact using stepwise regression in SAS. A part of the modeling involves determining if there are influential points in the data and if there are significant outliers that skewed the model. A summary of model fits after outlier rejection is given in Table 3.

TABLE 3

Model Statistics for PETEOS on AMT 5000.

| Parameter | dr1 | dr2 | dr3 | dr4 | dr5 | dr6 | dr7 | dr8 | dr9 | Stress |
|---|---|---|---|---|---|---|---|---|---|---|
| RMS Error | 1.177 | 1.126 | 1.226 | 1.267 | 1.060 | 1.332 | 1.363 | 1.515 | 1.297 | 9.182 |
| $R_2$ | 0.992 | 0.992 | 0.990 | 0.989 | 0.993 | 0.988 | 0.987 | 0.985 | 0.989 | 0.994 |
| Adj. $R_2$ | 0.986 | 0.985 | 0.982 | 0.980 | 0.987 | 0.978 | 0.976 | 0.972 | 0.980 | 0.991 |

One of the goals of the Monitor Wafer Controller for the PETEOS process is to use the monitor wafers to estimate the process state, and if the process state has changed, the controller determines a recipe that would bring the product quality characteristics on target. The controller accomplishes this in two stages. The first stage is model tuning. A multi-variable, model form independent, control strategy was used in the controller. In this stage, the controller estimates changes in the models required to capture the changed process state. Mathematically, the problem of tuning can be formulated as the following weighted least squares minimization problems:

$$\min_{g_j, o_j} \frac{1}{w_1 s_1^2} \sum_{k=1}^{n} [y_{1k} - f_1(g_1 * x_1, x_2 + o_2, g_3 * x_3, A_1, c_1)]^2 \quad (7)$$

$$+ \frac{1}{w_m s_m^2} \sum_{k=1}^{n} [y_{mk} - f_m(g_1 \times x_1, x_2 + o_2, g_3 * x_3, A_m, c_m)]^2 \quad (8)$$

and $$\min_{\delta_i} \frac{1}{w_1 s_1^2} \sum_{k=1}^{n} [y_{1k} - f_1(g_1^{'*} x_1, x_2 + o_2^{'}, g_3^{'*} x_3, A_1, c_1 + \delta_1)]^2 \quad (9)$$

$$+ \frac{1}{w_m s_m^2} \sum_{k=1}^{n} [y_{mk} - f_m(g_1^{'*} \times x_1, x_2 + o_2^{'}, g_3^{'*} x_3, A_m, c_m + \delta_m)]^2, \quad (10)$$

where $x_i$ is the ith controllable, $y_i$ is the ith observable, $f_i$ represents the functional form of the model corresponding to $y_i$, $w_i$ is the weight corresponding to $f_i$, $A_i$ represents the vector of coefficients in $f_i$, $c_i$ are the bias/constant terms in $f_i$, $g_j$ is the gain corresponding to $x_j$, $o_j$ is the offset corresponding to $x_j$, and $\delta_i$ corresponds to the bias added to $c_i$.

In the Monitor Wafer Controller, the models were weighted by the respective estimated variances (the variances are estimated during model construction). This is because a deviation from model predictions for models with small variance should be penalized more than a same deviation from models with large variance. The use of variances for weighting is sufficient if the models represent statistically independent, or quasi-independent, random variables.

If a process state change is detected, the controller attempts to find a recipe that will bring the goals to target. This is the purpose of the sequential optimization. Mathematically, using the previous notation, the sequential optimization task can be formalized as:

$$\min_{x_1,\ldots,x_n} \sum_{i=1}^{p} w_i |y_i^* - t_i(f_1(x_1,\ldots,x_n),\ldots,f_m(x_1,\ldots,x_n))|^2 \quad (11)$$

such that $y_i^L \leq g_i(f_1,\ldots,f_m) \leq y_i^H, i = 1,\ldots,p;$ and $$x_j^L \leq x_j \leq x_j^H, j = 1,\ldots,n;$$

where $y_i^L, y_i^H$ are the low and high specification limits on the ith output, $y_i$.

$t_i()$ are the functions transforming models to goals.

$x_j^L, x_j^H$ the low and high limits on the jth input, $x_j$.

$f_i()$ is the toned model representing the transformation from $x_j$s to $y_i$.

$h_k()$ is the model representing the transformation from $x_j$s to $z_k$.

$y_i$ is the goal/target output value corresponding to $y_i$, and $w_i$ is the weighting corresponding to the ith output parameter $y_i$.

$g_i$ is any transformation on the site models.

The above formulation show that process goals are different from the models through the use of the function $t_i$. Furthermore, this formulation accommodates process goals that could be either targets or constraints.

The above discussion shows that process goals could be different from the modeled parameters. Furthermore, goals can be of two types: targets and constraints. Targets are explicitly optimized by the optimizer. Constraints further restrict the allowable subspace of equipment settings in which the optimizer seeks to optimize the targets. The controller requires that weights be specified for the optimizations performed during model tuning and sequential optimization.

As with the Monitor Controller in the referenced issued patent, the weights for sequential optimization reflect the relative importance of different targets that are optimized. Selecting these weights requires some judgment and experience with the process being controlled. The objective is to find a set of weights that enables the optimizer to produce a recipe that brings the process within allowed tolerances and as close to the target as possible, without violating any constraints.

A second set of weights arise in the optimization performed during model tuning. The weighting provided by the model variances is appropriate if the models represent statistically independent, or quasi-independent random variables. However, in the case of site models and deposition rate, the models represent random variables that can be expected to be correlated with each other. As a result, since there are nine site models and one stress model in the tuning equation, the tuning is biased to compensate more for errors in predicting deposition rate than errors in predicting stress. That is, ignoring the weighting due to model variances, deposition rate is considered roughly nine times as important as stress. A more general solution is to explicitly introduce weighting in addition to model variance. Therefore, in tuning the weight for the model, $f_i$ is taken to be $w_i s_i^2$. In the PETEOS controller $w_i=9$ for each of the nine site models, and $w_i=1$ for the stress model.

Module Level Control

Using the methods of the prior applications, as discussed above, only a single process was manipulated to control nonuniformities. It was discovered that the use of site models and these methods could be used to an increased advantage by correlating the goals of these interrelated processes. Thus, the method of the prior application was modified to take into account the interactions of processes in a process module and thereby control the nonuniformities over several processes by changing the goals of previous processes.

Figure 3:
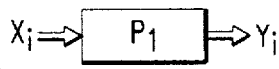
FIG. 3 is a typical process control of a single process according to the prior art.
Figure 4:
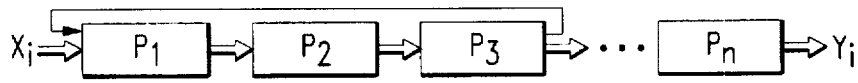
FIG. 4 is a process control sequence of the present invention.

The technique of using site models to control nonuniformity measures as discussed above can be represented as shown in FIG. 3. This technique uses a single process with inputs $X_i$ and outputs $Y_i$ with site models to determine new inputs to be used for continued processing to control nonuniformities for this process. A method of the present invention is represented by FIG. 4. FIG. 4 shows several processes $P_1$, $P_2$ through $P_n$ which are interrelated processes that function as a process module or a subset of a process module. One or all of these processes may be controlled as previously discussed to control nonuniformities using site models. In FIG. 4 feedback from process $P_3$ is shown back to process $P_1$. This method makes use of the site models to achieve spatial patterns in process $P_1$ to compensate for spatial patterns introduced by subsequent processes to improve uniformity of the overall sequence of processes.

The processes illustrated in FIG. 4 may contain both controlled and uncontrolled processes. Generally, an uncontrolled process is a process where the process effects drift without any attempt to change them or bring them to target. There may be several reasons why a process is uncontrolled. For example, the process equipment may lack a controller, the tests needed may be expensive or destructive, or there may not be sensors available to make the tests needed to control the process. On the other hand, a controlled process is one whore the process effects are kept within specified tolerances or a target. The present invention allows a controlled process to be used to compensate for the effects of a subsequent uncontrolled process.

Figure 5:
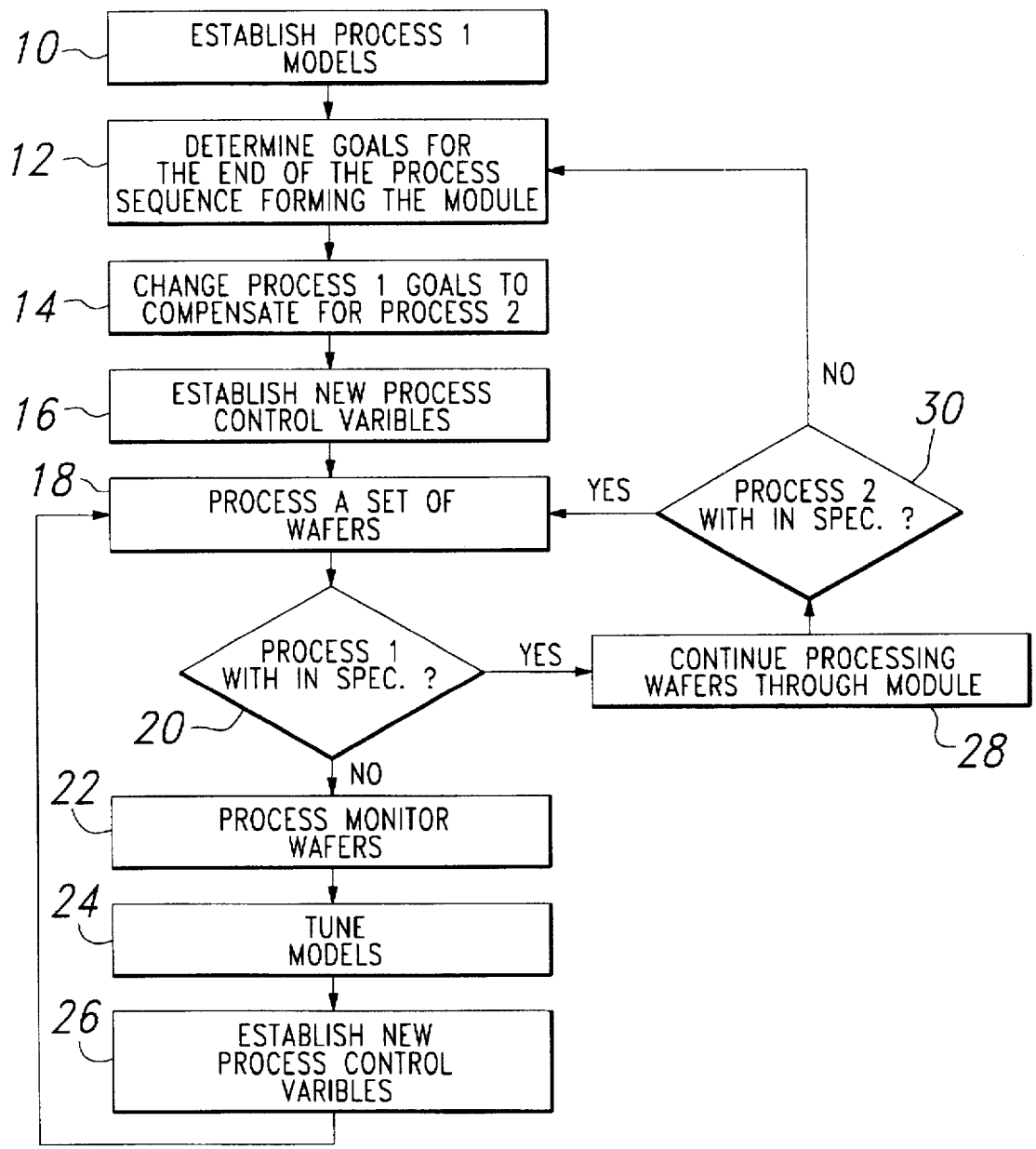
FIG. 5 is a flow diagram for an embodiment of the present invention.

FIG. 5 illustrates a process flow for an embodiment of the present invention. The first step of the process 10 is to establish process models for a controlled process of a module, preferably as discussed above for the PETEOS process. The next step 12 is to determine goals for a subsequent process or for the complete process module. These goals are typically goals at the output of an uncontrolled process as described above. The goals of the controlled process are then modified 14 to compensate for the subsequent uncontrolled process and new process control variables are calculated 16 for the modified process goals. Processing of product wafers 18 can then begin. At the first decision box, product wafers are tested subsequent to completing process 1 to determine if the product wafers are within specification tolerances. If the product wafers are not within tolerances the flow proceeds essentially as disclosed in U.S. patent application Ser. No. 08/201.302. This portion of the flow diagram is to develop a new process control variable, or a new process recipe, by processing monitor wafers and tuning the cite models as discussed in the above referenced patent. After new process control variables are determined, processing of product wafers can resume as shown at 18.

If process 1 is within process specifications at the first decision box 20, processing of product wafers continues through the module processes 28 to the uncontrolled process that is being optimized, designated as process 2, realizing there may be several intervening processes. At the second decision box 30, product wafers are checked to determine if process 2, as affected by process 1, is within specification tolerances. If process 2 output is within specification additional wafers may be processed as indicated by the arrow from decision box 30 to box 18. If process 2 output is not within tolerance, flow returns to the goal state 12.

It should be noted that there are invariably limitations to the amount of compensation that can be made by an earlier process for a subsequent process. These limitations may be dictated by the earlier process, intervening processes, etc. The limitations may be dictated by the amount of spatial variation that is within the range of the process controls and the equipment being used. The methods of this invention do not improve the capability of processing equipment to reduce spacial variations, but attempt to capitalize on these possible variations to maximize the control of the processes in the module.

The two embodiments of the present invention introduce methods to control and minimize nonuniformities for a specific sequence of processes or modules relating to a the production of CMOS semiconductor circuits. The goals of these processes include fabricating uniform vias or contacts during multilevel metalization of a semiconductor circuit. Steps in this sequence include deposition of a thin film of dielectric (PETEOS), planarization of the dielectric film, and patterning and etching vias to form the contacts.

The first embodiment is directed to the planarization process or module. A typical process used to planarize the PETEOS oxide on the surface of the wafer is chemical-mechanical polishing (CMP). Often, CMP equipment has a known nonuniformity pattern. For example, the center is thicker than the edge of the wafer at the completion of the CMP process. It was discovered that the goals of the PETEOS deposition process model could be modified to produce a thickness variation across the wafer which could be used to compensate for the center-thick CMP process. Accordingly, the method of the present invention was used to design a PETEOS process to be center-thin, thereby providing better uniformity at the end of planarization process, a subsequent step in the process module. This method makes use of the site models ability to achieve spatial patterns to compensate for radial and spatial patterns introduced by subsequent processes.

A second embodiment of the present invention relates to PETEOS deposition as part of the sequence of processes that form the via or contact during multilevel metalization of a semiconductor circuit. The oxide deposited by the PETEOS process on a semiconductor wafer is patterned and etched to fabricate vias or contact holes to form electrical connections from one level of metalization to another. For this process it is necessary to not only control the film thickness and stress during deposition, but to also control the film stoichiometry. Since etch rate is highly dependant on the PETEOS film stoichiometry, it is possible to affect output of a subsequent etch process by changing the film stoichiometry in a previous step.

Control of etch rate through control of film stoichiometry was achieved in the MWC by making the etch rate, which is a goal of a subsequent etch process, one of the goals of the deposition process. Etch rate measurements obtained by performing the etch step on the monitor wafers used during deposition were used as observations to control the deposition process to keep not only the deposition characteristics, like deposition rate, stress and uniformity in control, but to also keep the etch rate of the subsequent process in control. Therefore, by changing the deposition process one can compensate for drifts and shifts of a subsequent process which is uncontrolled.

A few preferred embodiments have been described in detail hereinabove. The embodiments are not meant to limit the invention to the specific embodiments enclosed. The numbers used as values in the embodiments can be changed without changing the scope of the claimed invention. It is to be understood that the scope of the invention also comprehends embodiments different from those described, yet within the scope of the claims.

What is claimed is:

1. A method of simultaneously controlling a plurality of nonuniformity measures in processing discrete products through a module consisting of a plurality individual processes, said method comprising:
   a. establishing a process model for a first process of said module by relating a plurality of product quality parameters to a plurality of process control variables to obtain an initial setting for said plurality of process control variables;
   b. determining goals for the output of a second process in said module subsequent to said first process which could be better achieved by changing the output of a previous process;
   c. changing the goals of said first process of said module to achieve the goals of said second process and establishing a set of process control variables for said first process;
   d. processing one or more products and measuring one or more product quality parameters on said products;
   e. exercising quality control tests on said products;
   f. if quality control tests do not indicate significant difference from said first process model prediction and goals then continuing processing at step g, otherwise continue by:
      (1) processing at least one monitor product to obtain observations for tuning using settings determined by local experiment design;
      (2) tuning said process models to create tuned process models using said plurality of product quality parameters from said products of step d, wherein said tuning estimates a changed state of said processing with the use of process models;
      (3) estimating new values for said plurality of process control variables from said tuned models; and
      (4) continuing processing products with said new values of said plurality of process control variables by repeating again at step d, substituting new products for said first plurality of products;
   g. continuing to process plurality of products through subsequent process of said process module; and
   h. monitoring the output of said second process and continuing processing a step g if said output of said second process is within process goals otherwise continuing with step b if said output of said second process is not within process goal tolerances.

2. The method of claim 1, wherein said process models include site models and said site models model measures of nonuniformity and asymmetry as functions of sites.

3. The method of claim 1, wherein said plurality of product quality parameters is a function of a plurality of model outputs of said process models, thereby providing a separation of said plurality of model outputs from said predetermined set of goals.

4. The method of claim 1, wherein site models are used to define uniformity patterns at a process step to compensate for nonuniformity introduced by a subsequent step.

5. The method of claim 1, wherein a controlled process in the module is used to compensate for non-controlled subsequent process in the module.

6. The method of claim 1, wherein said discrete products are semiconductor wafers.

7. The method of claim 6, wherein said process models include site models and said site models model measures of nonuniformity and asymmetry as a functions of sites.

8. The method of claim 6, wherein said plurality of product quality parameters is a function of a plurality of model outputs of said process models, thereby providing a separation of said plurality of model outputs from said predetermined set of goals.

9. The method of claim 6, wherein site models are used to define uniformity patterns at a process step to compensate for nonuniformity introduced by a subsequent step.

10. The method of claim 6, wherein a controlled process in the module is used to compensate for non-controlled subsequent process in the module.

11. A method of simultaneously controlling a plurality of nonuniformity measures in processing semiconductor wafers through a module consisting of a plurality individual processes, said method comprising:

a. establishing a process model for a first process of said module by relating a plurality of product quality parameters to a plurality of process control variables to obtain an initial setting for said plurality of process control variables wherein said process models include site models and said site models model measures of non-uniformity and asymmetry as a functions of sites;

b. determining goals for the output of a second process in said module subsequent to said first process which could be better achieved by changing the output of a previous process;

c. changing the goals of said first process of said module to achieve the goals of said second process and establishing a set of process control variables for said first process;

d. processing one or more wafers and measuring one or more product quality parameters on said products;

e. exercising quality control tests on said wafers;

f. if quality control tests do not indicate significant difference from said first process model prediction and goals then continuing processing at step g, otherwise continue by:

(1) processing at least one monitor wafer to obtain observations for tuning using settings determined by local experiment design;

(2) tuning said process models to create tuned process models using said plurality of product quality parameters from said wafers of step d, wherein said tuning estimates a changed state of said processing with the use of process models;

(3) estimating new values for said plurality of process control variables from said tuned models; and (4) continuing processing wafers with said new values of said plurality of process control variables by repeating again at step d, substituting new wafers for said first plurality of products;

g. continuing to process plurality of wafers through subsequent process of said process module; and h. monitoring the output of said second process and continuing processing a step g if said output of said second process is within process goals otherwise continuing with step b if said output of said second process is not within process goal tolerances.

12. The method of claim 11, wherein said plurality of product quality parameters is a function of a plurality of model outputs of said process models, thereby providing a separation o f said plurality of model outputs from said predetermined set of goals.

13. The method of claim 11, wherein site models are used to define uniformity patterns at a process step to compensate for nonuniformity introduced by a subsequent step.

14. The method of claim 11, wherein a controlled process in the module is used to compensate for non-controlled subsequent process in the module.

15. The method of claim 11, wherein said process module includes the processes of depositing PETEOS oxide on said wafer and etching contact vias.

16. The method of claim 11, wherein said process module includes the processes of depositing PETEOS oxide on said wafer and planarizing by chemical mechanical polishing.

17. A method of controlling a multi-step process module for manufacturing a product, said method comprising the steps:

a. processing a raw material input with a controlled process with at least one controllable parameter to produce an intermediate product;

b. processing said intermediate product with at least one uncontrolled process to produce a final product, at least one uncontrolled process producing nonuniform results across said final product;

c. measuring characteristics of said final product to determine if the final product is within specification throughout said final product;

d. adjusting at least one parameter of said controlled process to compensate for the nonuniform effect of step b if said final product is not in specification; and e. repeating steps a–d.

18. The method of claim 17, wherein site models are used to define uniformity patterns at a process step to compensate for nonuniformity introduced by a subsequent step.

19. The method of claim 17, wherein a controlled process in said module is used to compensate for non-controlled subsequent process in the module.

20. The method of claim 17, wherein said process module includes the processes of depositing PETEOS oxide on a wafer and etching contact vias.

21. The method of claim 17, wherein said process module includes the processes of depositing PETEOS.

\* \* \* \* \*